United States Patent [19]

Deboufie et al.

[11] Patent Number: 4,950,444
[45] Date of Patent: Aug. 21, 1990

[54] PROCESS FOR THE FORMATION OF FIBER FELT CONTAINING AN ADDITIONAL PRODUCT

[75] Inventors: Fetit E. Deboufie, Petit Couronne; Daniel Nouvier, Rouen, both of France

[73] Assignee: Saint-Gobain Recherche, Aubervillers, France

[21] Appl. No.: 260,710

[22] Filed: Oct. 21, 1988

Related U.S. Application Data

[63] Continuation of Ser. No. 510,827, Jul. 5, 1983, abandoned.

[30] Foreign Application Priority Data

Jul. 6, 1982 [FR] France .................................. 82 11813

[51] Int. Cl.[5] .............................................. B29C 67/00
[52] U.S. Cl. ...................................... 264/37; 264/518; 264/116; 264/118
[58] Field of Search ....... 264/109, 121, 123, DIG. 69, 264/DIG. 80, 6, 37, 518, 116, 118, 122, 136, 140, 146

[56] References Cited

U.S. PATENT DOCUMENTS

| | | | |
|---|---|---|---|
| 2,189,840 | 2/1940 | Simison et al. | 425/83.1 |
| 2,940,135 | 6/1960 | Heritage | 264/518 |
| 3,381,069 | 4/1968 | Simison | 264/518 |
| 3,544,414 | 12/1970 | Simison | 264/518 |
| 3,740,797 | 6/1973 | Farrington | 264/518 |
| 4,022,861 | 5/1977 | Levesque | 264/116 |
| 4,199,367 | 4/1980 | Smith | 264/136 |
| 4,359,445 | 11/1982 | Kane et al. | 264/518 |
| 4,375,448 | 3/1983 | Appel et al. | 264/518 |
| 4,396,561 | 8/1983 | Liebert | 264/6 |

FOREIGN PATENT DOCUMENTS

| | | |
|---|---|---|
| 2553459 | 6/1975 | Fed. Rep. of Germany . |
| 56-25546 | 6/1979 | Japan . |
| 1336426 | 11/1973 | United Kingdom . |

Primary Examiner—Jan H. Silbaugh
Assistant Examiner—Mary Lynn Fertig
Attorney, Agent, or Firm—Oblon, Spivak, McClelland, Maier & Neustadt

[57] ABSTRACT

The production of mineral fiber felt into which an additional product is introduced. The felt is made partly of freshly formed fibers and partly of recycled fibers which are conveyed into a receiving chamber in which the felt is formed. The additional product is introduced with the recycled fibers. One advantageous application includes applying a surface active agent to the recycled edges to form a supporting material for hydroponic culture.

5 Claims, 4 Drawing Sheets

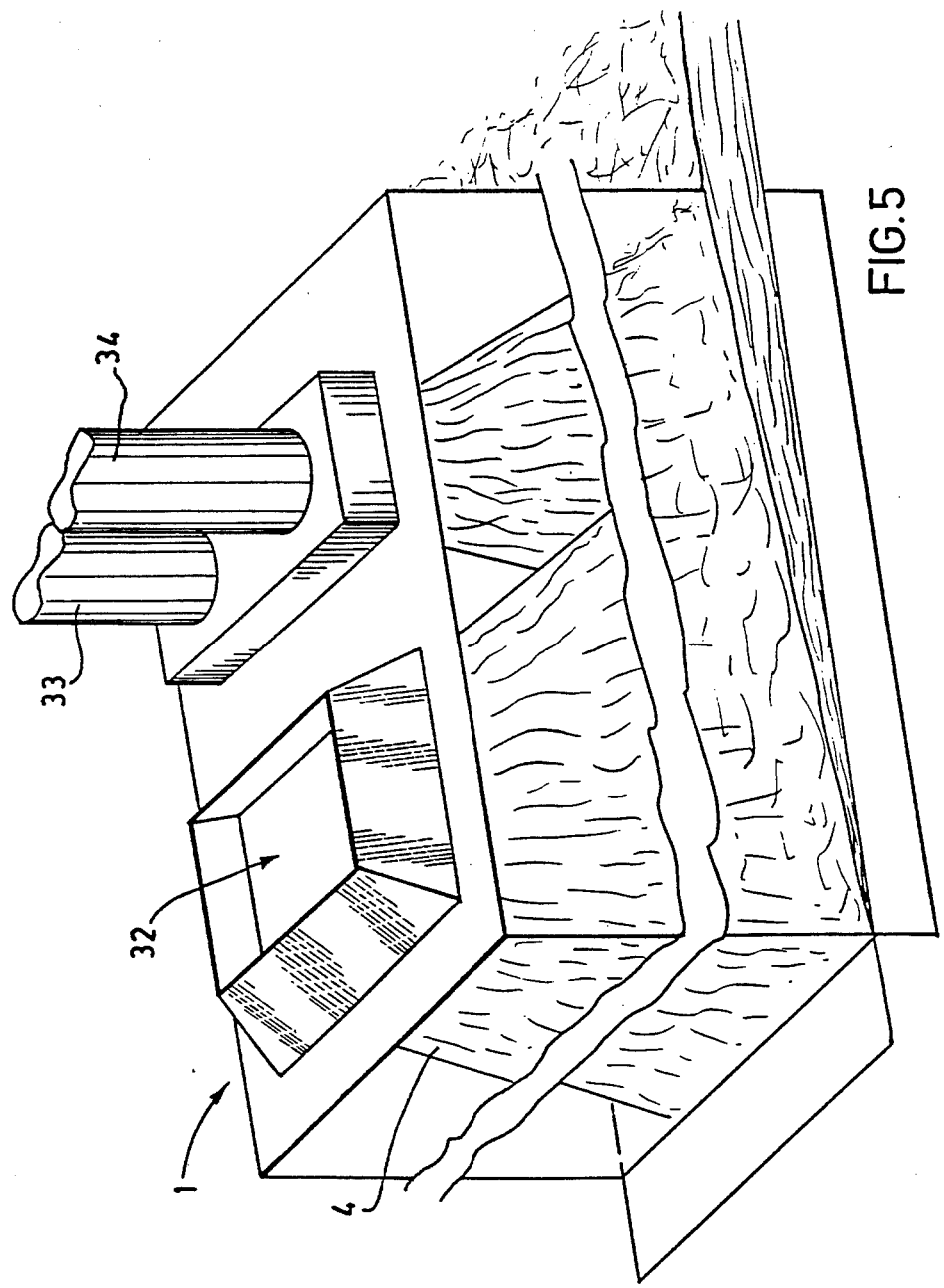

PROCESS FOR THE FORMATION OF FIBER FELT CONTAINING AN ADDITIONAL PRODUCT

This is a continuation of Application Ser. No. 06/510,827, filed Jul. 5, 1983, now abn.

This invention relates to the production of mineral fibre mats or felt into which an additional product is introduced.

The formation of felt from mineral fibres is carried out by well known processes. The felt is normally formed immediately after production of the fibres from the mass of molten material. The fibres which have just been formed are in suspension in a gaseous current used for their attenuation, cooling. transport or several of these functions simultaneously. The gaseous current is filtered on a perforated conveyor belt which holds back the fibres in a matted collection forming the felt. In order to impart mechanical stability to this felt, a binder composition is sprayed over the path of fibres preceding their reception on the conveyor belt. This composition of binder is normally based on a resin, in particular phenol formaldehyde resin or the like.

Subsequent passage of the coated mat into a heat treatment container which may, if applicable, be a simple oven, effects curing the binder and fixes the dimensional and mechanical characteristics of the fibre mat which is then normally cut and treated according to its intended use.

One traditional operation forming part of this treatment consists of cutting the two edges of the felt to reduce the felt to the precise dimensions required and at the same time eliminate the irregularities which are liable to form on the edges of the felt.

It will be obvious that for certain specific uses it would also be desirable to introduce into the fibrous mass of the felt certain products or compositions which either modify the properties of the felt or bring out certain properties not found in a felt which has been prepared solely from fibres and binder.

Thus, for the most widespread use of this type of fibre felt namely the formation of heat and sound insulating materials, it is advantageous in certain cases to introduce a hydrophobic agent to protect the fibres against degradation caused by water or atmospheric humidity. In other cases it is desired to improve the hydrophilic character of these products, for example if they are to be used as substrates for "soil-free" cultures also known as hydroponic cultures.

Modification of the properties of fibre felts which have been fixed with a binder poses the problem of how to introduce into the mat the products which are capable of modifying its properties. The additional products are normally introduced in liquid form but in some cases they may be in solid form, in particular in the form of a powder, as described in particular in Patent FR-A-1 531 488.

The chemical constitution of the products introduced as well as their physical form may give rise to difficulties, particularly if the additional product is required to be very homogeneously distributed in the felt It has been proposed for example in US Pat. No. 2,189,840, to apply the additional products in the same manner as the binder, that is to say by spraying the products into the gaseous current carrying the fibres to the receiving conveyor belt.

It has also been envisaged to combine the binder composition and the additional products so that only one spraying or atomization process is required This method, which may permit homogeneous treatment of the fibres and consequently of the resulting felt is unusable in certain cases, for example if the additional products react with the binder composition so that inactivation of the said products or degradation of the binder components results This method may also be unsuitable if due to a very high disproportion between the quantity of binder and the quantity of additional products the latter are trapped by the binder so that their action is masked or diminished.

Furthermore in the case of certain products it would appear to be a disadvantage to disperse them in the gaseous current carrying the fibres by the same method as that used for the binder If products are finely dispersed, they will never be completely fixed on the fibres owing to the conditions under which this fine dispersion is normally carried out. A not insignificant proportion of these products in suspension in the gaseous current passes through the receiving conveyor belt and is carried along in the gas which is discharged from the installation. It goes without saying that before the gases are discharged into the atmosphere, they are subjected to a suitable treatment to prevent atmospheric pollution. These treatments however, are expensive and sometimes difficult to carry out and, wherever possible it is preferable to proceed in such a manner that the effluent gases will contain as little charge as possible.

This is one of the reasons why other methods have been proposed for introducing the additional products. Among these methods may be mentioned those in which the very thin felt or film of fibres is impregnated with a liquid composition either by steeping the felt in a vat or by causing the composition to flow over the felt. These methods necessitate subsequent drying of the felt and are only suitable for very thin products. If the felt has a thickness of several centimetres, removal of the excess liquid and drying become too laborious to be economical.

Other methods have been envisaged which have proved, however, to be unsuitable due to the lack of homogeneity of the treatment. Thus, spraying the additional product over the felt does not result in uniform penetration; instead, the product is found to be concentrated in a superficial layer.

It is an object of the present invention to provide a new technique for the introduction of additional products into mineral fibre felts prepared by the method indicated above, which technique results in homogeneous distribution of the additional products and in uniformity of the properties produced by the presence of these products within the mass of the fibre felt Another object of this invention is to propose a technique which does not necessitate additional treatment of the effluent gases and in general does not modify the normal conditions of formation of the fibre felt as outlined above which prevail in the absence of these additional products According to the invention, the additional products are introduced into the felt together with recycled fibres It has been indicated above that the edges of the felt were cut when reducing the felt to the correct dimensions. This results in the formation of a varying quantity of fibrous products which are not directly used in the mat. These fibrous products and optionally also other fibres obtained from other sources are conventionally added to the freshly formed fibres so as to be reincorporated in the felt which is in the process of formation.

When the recycled fibres have been treated with binder they are converted into a form suitable for sufficiently homogeneous distribution. Thus, the edges which have been cut from the felt leaving the heat treatment are normally transferred to a crusher or cutter where they are reduced to particles of the order of a centimetre or less. It is normally preferred to reduce the particles to less than 15 mm.

If the recycled products are reduced to sufficiently small particles then not only can they be homogeneously distributed when introduced but also they do not substantially modify the properties, in particular the mechanical properties of the felt which is being formed. The fine structure of the material remains substantially unchanged. It is therefore possible to use a relatively high proportion of recycled product in the total quantity of products entering into the constitution of the felt. This proportion may reach or even exceed 20% although the proportion of recycled product is most commonly of the order of 10% or less.

According to the invention, the additional products are introduced together with the recycled fibres. For this purpose, the additional products are deposited on the fibres by suitable means depending on their physical condition. Pulverulent products may be mixed with the fibres and possibly fixed by means of a composition functioning as binder. Liquid products are sprayed on the fibres or poured over them to impregnate them. The fibres may also be steeped directly in the additional product or in a solution thereof. At this stage of the operation, the problems of drying mentioned above do not arise in the same way as for the felt of fibres itself. The drying operation is thus only applicable to a fraction of the fibres constituting the mat. Furthermore, the principle of recycling in any case entails another passage of the fibres carrying the additional product through the heat treatment container so that a separate drying operation is in most cases superfluous.

Impregnation of the recycled fibres, even if these constitute an important proportion of the material from which the felt is formed, does not result in any overcharging which could cause the felt to be excessively weighed down before it is stoved. As will be seen further on, particularly in the examples of practical application, the quantity of additional products introduced into the felt normally amounts to a very modest charge compared with the whole mass of fibres, that is to say of the recycled fibres and freshly formed fibres. On the whole, and particularly when the additional products are in liquid form, their mass does not normally exceed 5% of the total mass of the felt and is in most cases of the order of 3% or less.

If the proportion of additional products introduced into the felt is relatively small, the mass if these additional products may nevertheless be large compared with the quantity of recycled fiber. The only limits to be set are those governed by practical considerations. The added products must be capable of being fixed on the recycled fibres. The quantity which may be introduced under these conditions obviously depends on the ability of the products to adhere to the fibre.

In general, the mass of additional product is not greater than 50% of the mass of recycled fibres and is preferably less than 25%.

One advantage of using the recycled fibres as a vehicle for introducing the additional products into the felt is, as indicated above, that it provides for good distribution of these products throughout the mass and moreover without all the fibres having to be treated. It is obvious that in order to achieve this distribution, the recycled fibres must be homogeneously distributed. This homogeneous distribution is obtained by carrying out the process in such a manner that the recycled fibres are transferred to the conveyor belt where the felt is being formed with the fresh fibres.

Mixing of the fresh fibres and recycled fibres may be carried out at any point along the path of the fibres from the apparatus where they are formed to the conveyor belt. The turbulence produced in the carrier gas current ensures virtually instant mixing.

Transport of the recycled fibres to the chamber where the felt is formed is advantageously carried out by means of a gaseous current which on entering this chamber becomes mixed with the current carrying the freshly formed fibres.

The additional products introduced according to the invention into the fibre felt by means of the recycled fibres may vary widely. They may consist, for example, of products which modify the mechanical characteristics of the end product, in particular substances such as silicones which impart a soft handle to the end products. They may also consist of products which modify the resistance of the felt to certain agents, in particular to atmospheric humidity. They may also consist of specific agents for a given use purpose of the felt, as for example particles of silica to improve the resistance to high temperature or wetting agents if the end product is intended for use in a soil-free culture and therefore required to have a marked hydrophilic character.

It is also of interest to employ the technique according to the invention to introduce products for marking the felt, in particular colouring products, for example, to facilitate identification.

The technique according to the invention also permits the introduction of products which could not be envisaged with the earlier techniques. An example would be products which could only be introduced in the form of solutions in inflammable solvents.

The temperatures reached in the vicinity of the fibres and the relative confinement of the gaseous currents would obviously have entailed risks of fire and even explosion if these solvents had been used.

When proceeding in accordance with this invention, the additional products may be introduced into the recycled products in such a position that no risk of this kind arises. In particular, when it is necessary to use inflammable solvents it is possible to evaporate the solvents after their application to the recycled fibres and thus remove them before the recycled fibres are introduced into the receiving chamber.

Certain embodiments of the invention are described in detail below with reference to the attached sheets of drawings, in which FIG. 1 is an overall schematic view of an installation for the production of a fibre felt, FIG. 2 is a schematic view in perspective of the part of an installation where the edges of a fibre felt are cut and treated according to the invention.

FIG. 5 is a schematic view in perspective of the chamber for receiving freshly formed fibres showing means for recycling the fibres.

The introduction of additional products into recycled fibres in the zone of formation of the felt may be carried out in any installation containing this type of recycling arrangement. The recycling itself, that is to say the introduction of fibres in a dispersed form or in the form of small, bonded particles, may be carried out as part of any process in which freshly formed fibres carried by a gaseous current pass through a receiving chamber which is large in comparison with the gaseous current employed and in which the fibres are deposited on a filtering conveyor. The manner in which the fibres are formed do not affect the possibility of carrying out a recycling operation The quantity of products used may have to be considered where the proportion of recycled product is liable to influence the properties of the end product Modification of the intrinsic properties of the fibre mat occurs to only a relatively slight extent if the size of the recycled particles is sufficiently reduced and particularly if the proportion of recycled substance is maintained within the limits given above By way of indication, recycling of the fibres carrying an additional product may be carried out in conjunction with centrifugal attenuation using a gaseous current The process may be applied in particular to well known methods in which the molten material is projected by centrifugation through orifices in the peripheral wall of the centrifuge and the resulting filaments are taken up and attenuated by a gaseous current.

It is also applicable to techniques in which the material to be fiberized is projected over the periphery of a set of centrifugation wheels from which it becomes detached in the form of fibres carried by a gaseous current It may also be applied to techniques in which attenuation is effected solely by the action of gaseous currents or any other similar technique.

Figure 1:
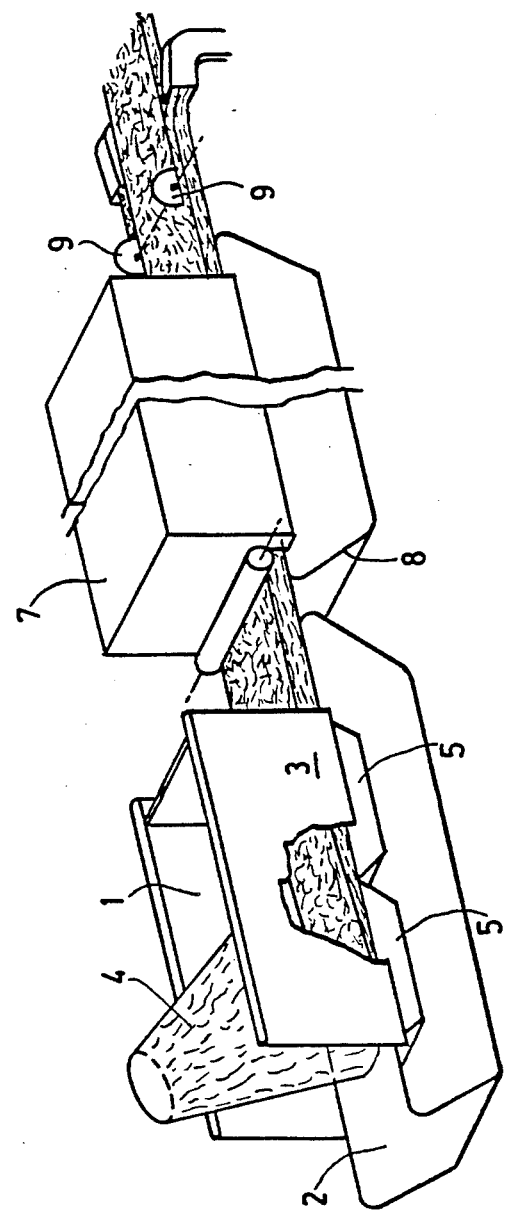

The method of formation of the fibres has not been shown in FIG. 1.

The receiving chamber is indicated by reference numeral 1. It is normally bounded at the bottom by the conveyor belt 2 and, as is also conventional in numerous techniques, the side walls 3 are movable to allow for continuous cleaning. Chamber 1 is closed at both ends and at the top by fixed walls. The upper wall and that of the front face have been removed in the drawing for the sake of clarity.

In the embodiment shown in this figure, the new fibres enter the chamber 1 from above. Other arrangements are also conventionally employed, in particular the introduction of new fibres from the front end.

Only one source of fibres is shown in FIG. 1 but it is customary to provide several simultaneously operating fibre forming stations for one and the same receiving chamber.

The fibres forming a bundle 4 carried by a gaseous current are deposited on the conveyor belt 2 while the carrier gas is sucked into the boxes 5 situated under the conveyor belt along the whole length of chamber 1. The air sucked in is evacuated through ducts (not shown).

The fibres collecting on the conveyor belt progressively form the felt 6.

Atomization of binder normally takes place at some point along the path of the fibres upstream of the receiving chamber, most frequently just after the fibres have been produced, although coating of the fibres may also take place in the receiving chamber. It is generally preferred to spray the binder as early as possible along the path of the fibres since this provides for optimum homogeneity of distribution of the binder on the fibres.

The felt 6 coated with binder composition is carried over a second conveyor 8 into the container indicated schematically at 7. In this container, the felt undergoes a heat treatment fixing the binder which is based, for example, on thermosetting resins or drying oils.

By the time the felt leaves the container 7, its mechanical properties are well stabilised and the felt is then ready to be cut down to the required size.

Systems such as circular saws, for example, make longitudinal cuts in particular to remove the irregular edges. The transverse cuts are made, for example, by means of a guillotine or movable saw (not shown). The treatment means at the end of the production line are also not shown in the drawing.

FIG. 1 shows in a very sketchy fashion the first elements of an apparatus for recycling the edges, shown in more detail in the following figures.

Figure 2:
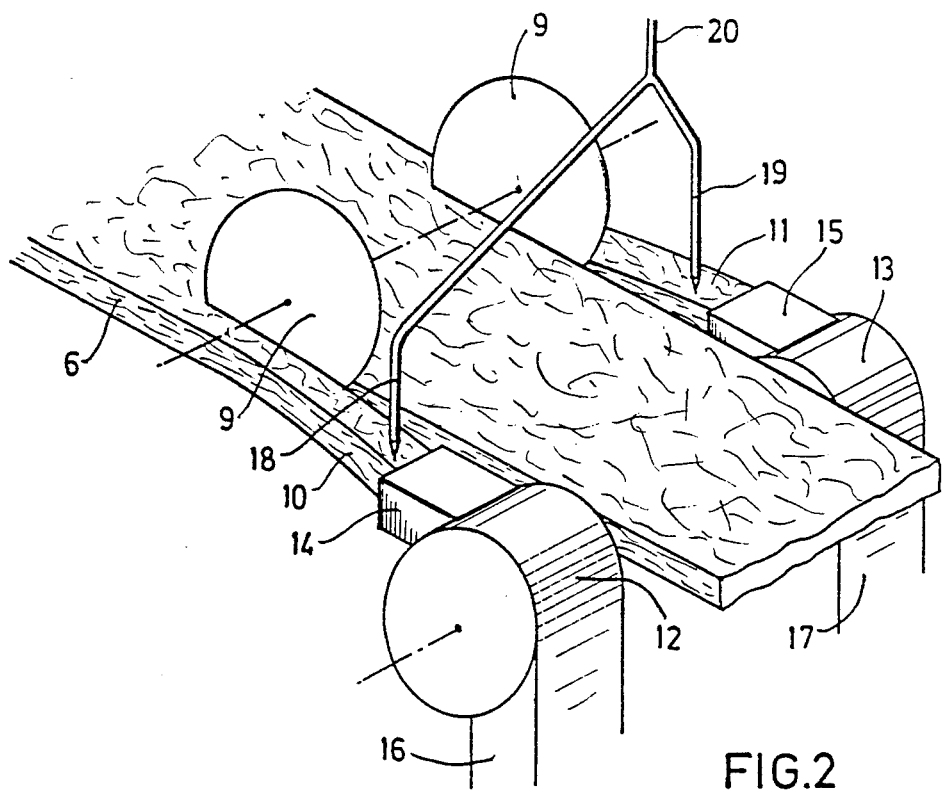

FIG. 2 shows on a larger scale the fibre felt 6 at the level where the edges are cut.

On this figure, the two edges of the felt are shown cut by saws 9. The means for driving these saws are not shown but are normally electric motors.

At the end of this operation, the felt has very straight, regular edges.

When the width of the mat is a multiple of the width of the end product, the operation of cutting the edges is normally combined with cutting the mat up longitudinally. In this case, for example, saws of the same type as those used to remove the edges are arranged in suitable positions The edges 10 and 11 removed from the fibre felt are transferred to cutters 12 and 13 by way of the ducts 14 and 15.

When these edges have been suitably cut up, they are returned to the chamber of formation of the mat by a circuit of ducts, the beginning of which is shown at 16 and 17.

Still in FIG. 2, a set of ducts 18, 19, 20 is arranged to apply a liquid composition to the edges 10 and 11. This composition may be supplied, for example, from a dosing pump (not shown) or any other analogous means.

In FIG. 2, a single system of ducts simultaneously supplies liquid to the two edges 10 and 11 through the ducts 18 and 19, but it would equally be possible to employ two separate circuits.

If the quantity of composition to be introduced with the recycled fibres is very small in proportion to the latter, it may be advantageous to pour the composition only over one of the two edges. Maintaining a uniform output at a very low rate may be a delicate operation in which case it is also preferable not to subdivide the flow over the two edges. Uniformity of distribution of the liquid composition in the felt is in fact more a result of random distribution of the recycled particles in the chamber of felt formation due to the mixing action to which these particles are subjected than a result of perfectly uniform distribution of this composition in the particles in question.

It is for the same reason that in the arrangement shown in FIG. 2, incomplete impregnation of the edges 10 and 11 by the stream of composition flowing from the ducts 18 and 19 does not prevent this composition from becoming sufficiently uniformly distributed in the felt finally obtained In the case shown in this FIG. 2, partial impregnation takes place before the material is cut up at 12 and 13. Mixing of the particles in the course of this operation and during transport to the receiving chamber is an additional factor promoting distribution of the composition over the whole mass of recycled fibres It goes without saying that the liquid may be introduced into the felt at the edges after the edges have been cutoff, as indicated in FIG. 2, but it is also possible to provide for its introduction into the corresponding part of the felt before the edges have been cut, provided the quantity of product introduced is such that it does not diffuse into the felt beyond the part which is subsequently cut off FIG. 2 shows a single duct for the supply of product on each edge but it is obviously also possible to apply several products to the edge. In that case the products may be applied to the same surface of the edge or they may be applied to several surfaces of the edge if this is more convenient for the purpose of impregnation, for example. This may be carried out in particular after partial return of the edge if the product is poured over it as a stream or it may be carried out by directing a jet under pressure to the exposed side or by any other suitable means.

In FIG. 2, the dimensions of the edges in proportion to the width of the felt have been greatly exaggerated for the sake of clarity, compared with the usual proportions. As an indication, for felts measuring 1.70 m in width, the two edges would not amount to more than 10% of the mass of fibres, and the proportion is even less when the felts are wider.

Bearing in mind the percentage, of product which may be recycled, it will be seen that other fibrous products may be used in addition to the fibres of the edges if applicable, in particular waste material obtained from fashioning certain articles or felt waste products obtained from other production lines in which the introduction of recycled products would not be necessary or even desirable.

Figure 3:
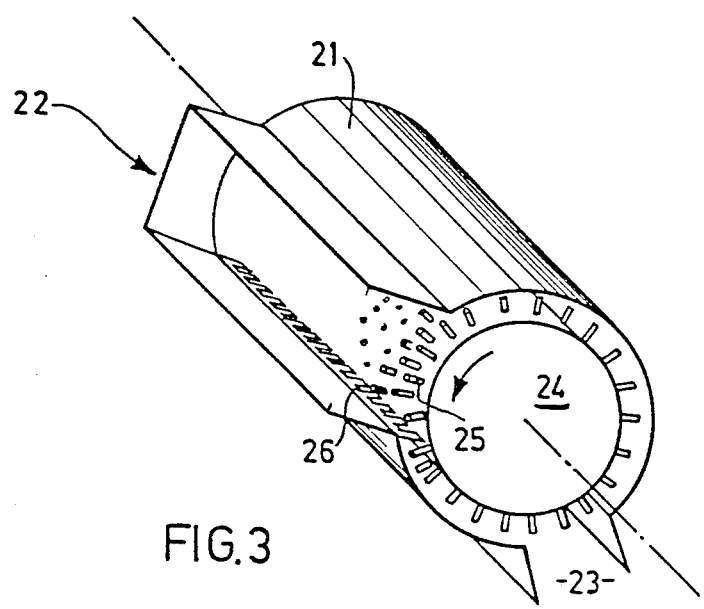
FIG. 3 is a schematic view in perspective with part removed of cutters for reducing the recycled fibres to a particle size suitable for their reintroduction into the felt which is in the process of formation.

FIG. 3 shows schematically a type of cutter which may be used in installations containing means for the recycling of products.

The cutter essentially consists of a drum 21 with two longitudinal openings 22, 23. The products to be cut up, for example, the edges, are introduced into the drum through the first opening 22. The second opening 23 serves for the evacuation of particles of fibres. Inside the drum 21 is a cylinder 24 with pins 25. The cylinder 24 is rotated by an external motor (not shown).

The cylinder moves in the direction indicated by the arrow. The fibrous products carried along by it are cut up between the pins 25 of the cylinder and the teeth of a comb 26. The positions of the teeth of the comb are complementary to those of the pins so that the product is chopped up as it passes over the comb.

Figure 4:
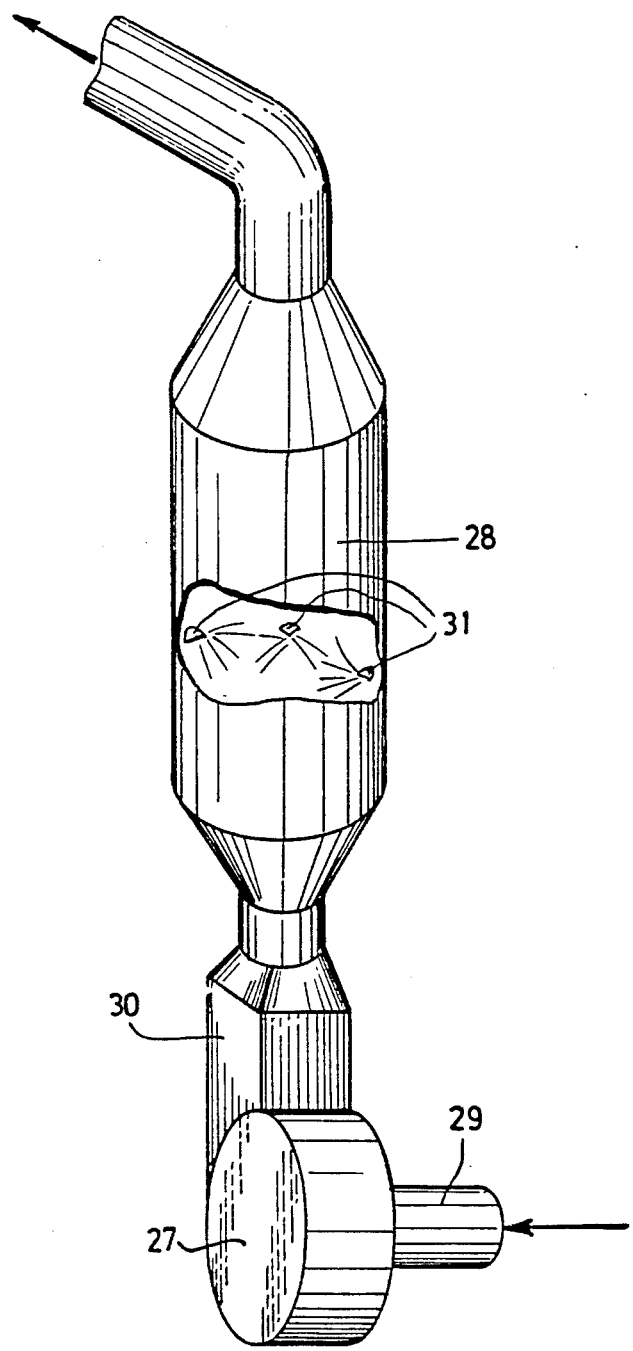
FIG. 4 shows another method of introducing the additional products into the recycled fibres according to the invention

FIG. 4 shows part of a recycling circuit for fibrous product, comprising an apparatus for the introduction of liquid composition into the recycled fibres by atomization of this composition.

The part of the circuit illustrated is situated downstream of the cutter and comprises a ventilator 27 and atomization chamber 28.

The ventilator sucks air through the duct 29 and passes it through the duct 30. The characteristics of the ventilator are chosen so that the velocity and flow rate of the air current produced enables the fibres to be carried along and prevents the formation of deposits in the recycling circuit.

Although this ventilator is shown combined with an atomization system, it is understood that a ventilator is also used when introduction of the additional product is carried out as indicated in FIG. 2.

The ventilator may be arranged as desired either upstream or downstream of the atomization chamber 28 and these apparatus may be either close together or far apart.

In the arrangement illustrated, the atomization chamber consists of a cylinder having a wider cross-section than the ducts of the circuit so that the velocity of flow of air and fibres is reduced in this cylinder and atomization is facilitated. The position of three atomization nozzles is indicated at 31.

The chamber may even be dispensed with, depending on the conditions of circulation of the gaseous current and the conditions of atomization, so that the liquid may be atomized directly into the recycling ducts.

Although only one apparatus for the introduction of additional product and only one type of such product are normally envisaged in a given production process, the technique according to the invention is also applicable to the case where one or more additional products may be introduced several times in the circuit for the recycling of the fibres.

One could, in particular, envisage the successive introduction of a pulverulent product and a liquid composition or of two separate liquid compositions, etc.

FIG. 5 shows the chamber for the formation of the fibre mat, with the end of the recycling circuit. This figure is not drawn to scale. Part of the height of the chamber has been omitted for convenience. In fact, to achieve uniform deposition of the fibres whatever their mode of production it is necessary to employ a relatively large chamber which enables the fibres to slow down and prevents crushing of the felt on the conveyor belt. Whatever the case may be, the receiving chamber 1 is normally high and/or long in relation to the dimensions of the mat produced. The bundle of fibres 4 entering chamber 1 through the trap 32 tends to spread out and occupy a maximum volume in this chamber.

The recycled fibres are brought to the top of the chamber through the ducts 33 and 34. Due to the intense mixing between the gaseous current carrying the freshly formed fibres and the gaseous current carrying the recycled fibres, an intimate mixture is formed, and all the more so the greater the length of the common path. The mixed fibres are deposited on the conveyor belt in random distribution which ensures that the recycled fibres carrying the one or more than one additional product will be uniformly distributed throughout the felt 6.

The ducts 33 and 34 correspond, respectively, to the recycling of each of the two edges although the edges could be recycled to chamber 1 by a single duct, in which case the two initially separate ducts could be joined up at any point of the recycling circuit.

Similarly, recycling of the additional fibres may or may not be combined with the introduction of additional products according to the invention.

The invention will now be described in more detail for a particular example of application.

The product prepared is a dense felt of fibres suitable for use as support for a so-called "soil-free" culture. Products of this type are characterised in particular by their capacity to retain water which they have absorbed. For this purpose, a certain quantity of surface active agent is introduced into the felt to either render it hydrophilic or increase its hydrophilic character.

To prepare these felts intended for soil-free culture, the surface active agent is conventionally incorporated in the binder composition and atomized with this composition over the fibres in process of formation.

This method of procedure entails certain disadvantages. Thus if the surface active agent is sprayed together with the binder, it behaves towards the treated fibres in the same manner as the binder. In particular, a not negligible proportion of the surface active agent fails to be fixed to the fibres and is carried along with the effluent gases. This not only results in a loss of product, which may amount to as much as 30 to 50% according to the mode of operation employed, but also gives rise to serious difficulties in the installations for scrubbing the effluent gases.

Before the gases are discarded into the atmosphere, they must be scrubbed to remove noxious components. The surface-active agents introduced into the scrubbing water gives rise to copious foaming which is difficult to control.

It is therefore necessary to employ an anti-foaming agent to prevent excessive foaming.

Furthermore the introduction of additional agents through the circuits normally employed for carrying the binder poses difficult cleaning problems From the industrial point of view is important that the installations should serve equally well for the production of the traditional type of insulating felts as for the production of felts containing additives In that case it is important that transfer from one type of production to the other should be able to be carried out as rapidly as possible without the quality of the product suffering.

In the proposed case of production of a felt containing a wetting agent it is essential that if the installation is subsequently to be used for the formation of insulating felt the surface-active agent should be completely removed which is a relatively complicated and lengthy operation if the agent has been introduced together with the binder The operation according to the invention, which consists of introducing the wetting agent with the recycled fibres, enables these difficulties to be overcome As an example a felt of fibres is prepared from a mixture of molten rocks based on high furnace slags by a process of centrifugation over a set of wheels rotating in opposite senses An aqueous solution of a phenol resin is sprayed over the fibres which are being formed by centrifugation as described in French Patent Application No. 81 03580 filed in the name of the Applicant Company.

After the felt has passed through the heat treatment, it is a relatively dense product having a density of the order of 80 kg/m$^3$.

The felt is prepared over an initial width of about 1.70 m. After stoving the edges are cut to reduce the width of the felt to 1.50 m. The edges, which amount to about 10% of the total mass of fibres, are transferred to a cutter of the type shown in FIG. 3 where they are reduced to particles not exceeding 10 mm. The cut up products sucked in by a centrifugal ventilator are returned to the top of the receiving chamber.

A wetting agent of the polyepoxy alcohol type is poured over each of the edges by a device such as that shown in FIG. 2.

It should be noted that in this arrangement the wetting agent is introduced in the pure state, thus avoiding the risks of error of dosage in the preparation of compositions such as might have occurred, for example, in earlier techniques when this agent was mixed with the binder. Errors which might otherwise occur in a changeover of production are also avoided. The composition of binder used in fact remains the same as that used, for example, for the formation of insulating felt. The change takes place in a separate circuit. There is therefore no risk of confusion.

In the case under consideration the total quantity of surface active agent introduced is about 50 kg for 300 kg of edge material treated per hour and for a felt production of the order of 3000 kg. This corresponds to approximately 10% of recycled fibres and a proportion of additive of 1.6% of the total mass of felt produced.

The wetting agent initially is absorbed by only part of the edge material but in the course of subsequent mixing of the recycled fibres, in particular in the cutter, the product becomes completely dispersed.

Compared with prior techniques, the production of felt under these conditions has resulted in a substantial reduction in the quantity of wetting agent required to produce a product having the same hydrophilic characteristics. These characteristics are determined in particular by the capacity of a sample of treated felt placed on a vessel filled with water to sink to the bottom of the vessel.

In the determination of the hydrophilic character, a sample measuring $100 \times 100 \times 75$ must be completely immersed in less than one minute.

It is found not only that the consumption of surface active agent is reduced but also that virtually no surface active agent, if any, is carried along in the effluent gases. After 6 hours, continuous operation of the installation, no "foaming" is detected in the effluent scrubbers and the use of anti-foaming agent would appear to be superfluous.

This absence of additional product according to the invention in the effluent gas is remarkable. It shows that the product carried with the recycled fibres remains with these fibres as it circulates.

Transfer from the production of product containing surface active agent to the production of insulating felt can be carried out virtually without any stoppage of the installation or with only a very brief interruption. About one hour is thus gained compared with the time normally required for changing production when the earlier techniques of introducing surface active agent with the binder composition were employed.

We claim:

1. A method for forming a fibrous felt hydroponic culture substrate, comprising:
   forming fresh mineral fibers from a molten melt in a formation zone, which fibers are entrained in a turbulent gaseous stream and deposited on one side of an advancing support and retained there by suction applied to the opposite side of said support, said fibers being uniformly sprayed with a binder comprising a thermosetting resin prior to deposit on said support and prior to exiting said formation zone, at least partially curing said binder downstream of said formation zone to set the felt formed by said fibers, said felt having two exterior edges, applying a surface active agent to the portions of said felt adjacent to said exterior edges downstream of said formation zone, said surface active agent rendering said fibers hydrophilic, trimming said surface active agent treated fiber material from said felt, and recycling said trimmed fiber material into said turbulent gaseous stream in said formation zone whereby said surface active agent treated fiber material is distributed throughout a felt formed from said recycled fibers and additional fibers introduced into said turbulent gas stream, said felt comprising said recycled fibers being substantially similar to that from which said excess fiber was trimmed, said recycled fiber being present in said felt in amounts no greater than 20%, by weight, of said felt.

2. The process of claim 1 wherein said surface active agent is poured onto and absorbed into said portions of the felt adjacent said exterior edges.

3. The process of claim 1 wherein said fibers are continuously deposited onto a continuously moving base on a conveyor belt and wherein said fibers are directed onto said base by suction means of the said conveyor belt.

4. The process of claim 1 wherein said trimmed fiber material is comminuted to a particle size of less than 15mm.

5. The process of claim 1 wherein the treated fibers contain up to 20% of surface active agent absorbed therein.

* * * * *